(12) United States Patent
Winzer

(10) Patent No.: US 7,269,356 B2
(45) Date of Patent: Sep. 11, 2007

(54) OPTICAL DEVICE WITH TUNABLE COHERENT RECEIVER

(75) Inventor: Peter J. Winzer, Tinton Falls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 765 days.

(21) Appl. No.: 10/615,701

(22) Filed: Jul. 9, 2003

(65) Prior Publication Data

US 2005/0008369 A1    Jan. 13, 2005

(51) Int. Cl.
*H04B 10/14*    (2006.01)
(52) U.S. Cl. .......................... 398/135; 398/83
(58) Field of Classification Search ............ 398/83–85, 398/135–139
See application file for complete search history.

(56) References Cited

U.S. PATENT DOCUMENTS

| 5,121,241 | A | * | 6/1992 | Veith ........................ 398/139 |
| 5,438,445 | A | | 8/1995 | Nakano |
| 6,078,418 | A | * | 6/2000 | Hansen et al. ............. 398/147 |
| 6,661,973 | B1 | | 12/2003 | Huber et al. |

OTHER PUBLICATIONS

"The Design and Development of a Hybrid RF/Laser Radar System for Measuring Changes in Ice Surface Elevation at Artic Regions" by Christopher T. Allen and Yanki Cobanoglu, University of Kansas Information and Telecommunication Technology Center Technical Report, May 2002, pp. 1-83.

* cited by examiner

*Primary Examiner*—Leslie Pascal

(57) ABSTRACT

An add-side laser in an optical device, such as an add/drop multiplexer OADM, provides not only a source for an add-side wavelength to be added to an output of the device, but also a reference for a receive-side coherent receiver that is included in the optical device.

21 Claims, 3 Drawing Sheets

OPTICAL DEVICE WITH TUNABLE COHERENT RECEIVER

BACKGROUND OF THE INVENTION

1. Field of the Invention

The present invention relates generally to the field of optical telecommunications, and, more specifically, to optical devices such as optical add/drop multiplexers (OADMs).

2. Description of the Related Art

In state-of-the-art, optical wavelength-division-multiplexed (WDM) communication systems, multiple, individually-data-modulated wavelengths of light are multiplexed into an optical fiber and routed to a remote location via ring or mesh optical networks. Along the path from source to destination, optical devices, such as OADMs, are commonly employed to modify the contents, and in some cases the quality, of the multiplex. Such modification includes grooming the multiplex by adding, dropping, replacing, and/or frequency-translating data-carrying wavelengths of light within the multiplex.

At the input or "drop" side of an OADM, an input WDM signal is typically split (e.g., using a power splitter) into a pass leg and a drop leg. The drop leg typically feeds a receiver that is configured to receive, detect, and demodulate one of the data-modulated wavelengths $\lambda_d$ of the input multiplex. The pass leg is typically fed to a wavelength blocker that is configured to block the dropped wavelength $\lambda_d$, and pass the rest of the wavelengths in the multiplex to the "add" side of the OADM. Alternatively, the functionality of power splitting and wavelength blocking can be integrated into a WDM demultiplexing filter.

At the add side of the OADM, an optical transmitter is configured to modulate a locally supplied data stream onto an optical carrier of the same wavelength $\lambda_d$ that was dropped from the drop side of the OADM. This modulated wavelength from the transmitter is then combined with the wavelengths of the multiplex that were passed to the add side from the drop side to form a new multiplex that is output from the OADM.

The transmitter in the OADM is commonly of the externally modulated laser variety. Such a transmitter includes a fixed-wavelength or a tunable laser coupled to a modulator (e.g., a Mach-Zehnder modulator) whose modulation is controlled by a properly coded version of the locally supplied data stream.

The receiver is typically of the direct-detection variety. Such receivers generally include a pin-type or avalanche-type photodiode coupled to an amplifier, filtering electronics, and a sampling/decision circuit.

SUMMARY OF THE INVENTION

Problems in the prior art are addressed in accordance with principles of the present invention by an optical device, such as an optical add/drop multiplexer (OADM), having an add-side laser that provides not only a source for an add-side wavelength to be added to an output of the device, but also a reference for a receive-side local oscillator in a coherent receiver that is included in the optical device. Thus, instead of having a separate local oscillator (LO) in the front end of the coherent receiver in the receive-side of the optical device, optical devices of the present invention use the optical signal generated by the add-side laser to provide a mixing frequency for the coherent receiver in either a heterodyne or a homodyne configuration.

In one embodiment, the present invention is an optical device that includes an optical receiver adapted to process at least a portion of an incoming optical signal received by the optical device and an optical transmitter adapted to generate at least a portion of an outgoing optical signal transmitted by the optical device. The optical transmitter comprises a light generator adapted to generate light for the portion of the outgoing optical signal generated by the optical transmitter, and the optical receiver receives and uses part of the light generated by the light generator to process the portion of the incoming optical signal.

In another embodiment, the present invention is method for processing WDM optical signals in an optical device. The method involves (a) splitting an incoming WDM optical signal received by the optical device into first and second parts, (b) dropping a first optical signal from the first part of the incoming WDM optical signal, (c) blocking the first optical signal from the second part of the incoming WDM optical signal, and (d) adding a second optical signal to the remainder of the optical signals in the second part of the incoming WDM optical signal to generate an outgoing WDM optical signal transmitted by the optical device. In this method, the first and second optical signals have substantially the same fundamental carrier wavelengths, and a portion of the light used to add the second optical signal is used to drop the first optical signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Prior Art Optical Add/Drop Multiplexer (OADM)

Figure 1:
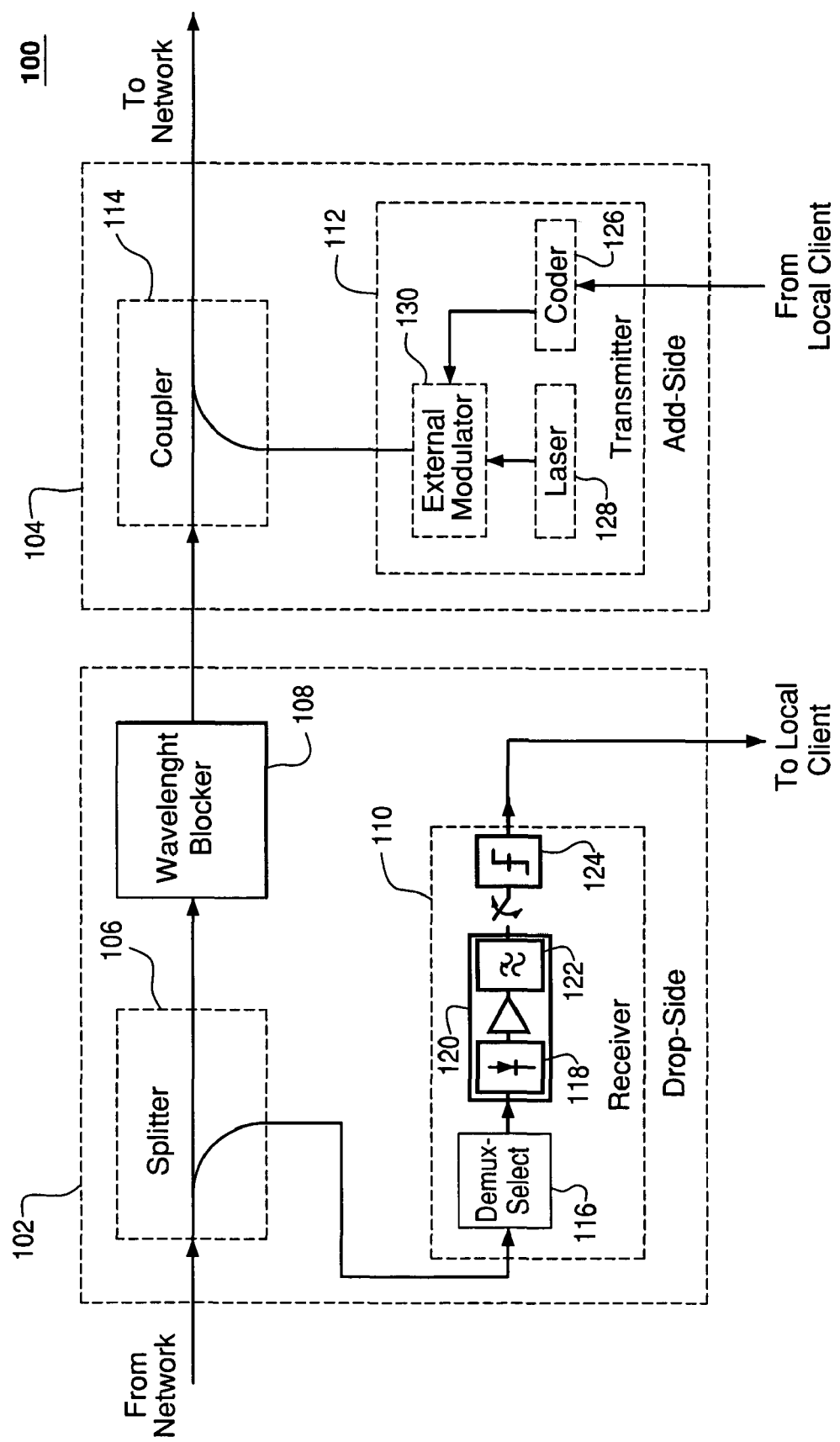
FIG. 1 depicts exemplary optical add/drop multiplexer (OADM) 100 according to the prior art.

FIG. 1 depicts exemplary OADM 100 according to the prior art. As shown, OADM 100 includes drop side 102 and add side 104. The drop side includes splitter 106, wavelength blocker 108, and receiver 110. The add side includes transmitter 112 and coupler 114.

At drop side 102 of the OADM, an input multiplex of data-encoded optical signals $S_d(\lambda_i)|_{i=1...N}$ is received from a network and split using power splitter 106 into a drop leg that feeds receiver 110 and a pass leg that feeds wavelength blocker 108. At receiver 110, one of the constituent elements (e.g., $s_d(\lambda_d)$), a "drop wavelength" component of the drop-leg multiplex signal is selected from the multiplex by demultiplexer-selector 116 and that element is passed to photodiode 118 where it is converted from an optical signal to an electrical signal. The electrical output of the photodiode is then amplified by preamplifier 120 and filtered by low-pass filter 122. The output of the low-pass filter is passed to sampling/decision circuit 124 for detection and recovery of the data that was modulated onto $s_d(\lambda_d)$ by an entity upstream of the OADM. The recovered data is then "dropped" to the local client. Wavelength blocker 108, which receives a copy of the wavelength multiplex on the "pass leg" out of splitter 106, is configured to block the dropped wavelength $\lambda_d$ associated with the dropped signal element $s_d(\lambda_d)$ and pass the rest of the elements $S_d(\lambda_i)|_{i=1\ldots N, i \neq d}$ in the multiplex to the add side of the OADM. Alternatively, in place of colorless splitter 106, demux select 116 and wavelength blocker 108 on the add side, and coupler 114 on the drop side, state-of-the art implementations of OADMs might use, without change in functionality, a wavelength-selective drop filter on the add side, and a wavelength-selective add filter on the drop side. This alternative arrangement has the advantage of reduced insertion losses.

At add side 104 of the OADM, optical transmitter 112 is configured to modulate a locally supplied data stream onto an optical carrier of the same wavelength $\lambda_d$ that was dropped from the drop side of the OADM. This modulated optical carrier $s_a(\lambda_d)$ from the transmitter is then combined in coupler 114 with the wavelengths of the multiplex that were passed from the drop side to the add side of the OADM to form a new multiplexed signal $S_a(\lambda_i)|_{i=1\ldots N}$ that is output from the OADM.

Specifically, in the exemplary externally modulated transmitter configuration 112 depicted in FIG. 1, laser 128 is tuned to a wavelength $\lambda_d$, and its output is fed to external modulator (e.g., Mach-Zehnder modulator) 130 where the laser output at wavelength $\lambda_d$ is modulated with data from the local client that might have been pre-coded (e.g., return-to-zero (RZ) coded) by coder 126. This modulated add-side component signal $s_a(\lambda_d)$ is then fed to coupler 114 where it is combined with the elements of the input multiplex $S_d(\lambda_i)|_{i=1\ldots N, i \neq d}$ that were passed to the coupler by drop side 102, and the resulting complete multiplex is then output from the OADM.

Note that, as is common in the prior art, receiver 110 is of the direct-detection variety. However, recently, there has been interest in the use of coherent receivers, especially for free-space optical applications. Such receivers typically make use of a local oscillator (LO) in their front end to provide a mixing frequency in either a heterodyne or a homodyne configuration.

Coherent OADM

Figure 2:
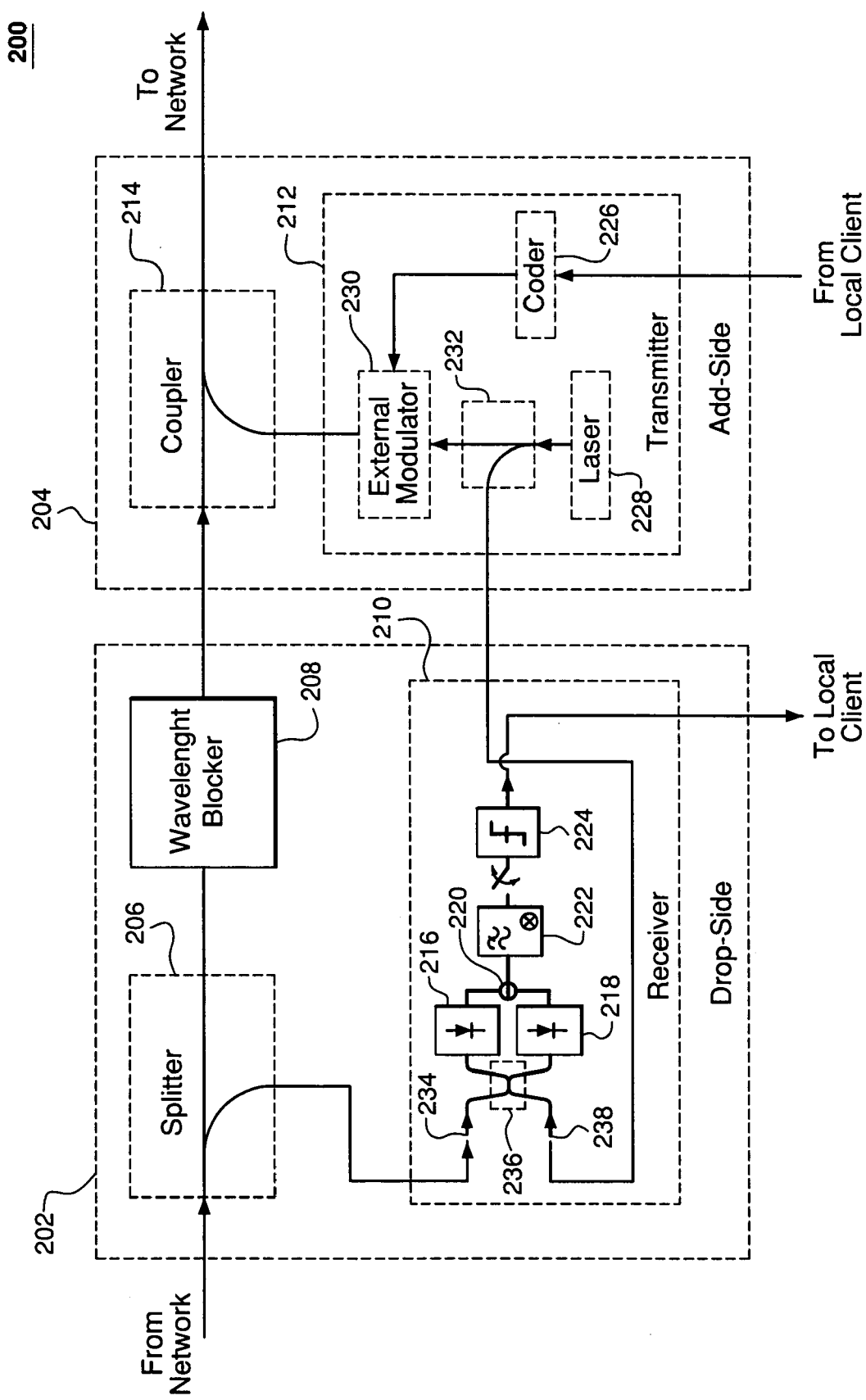
FIG. 2 depicts exemplary coherent-receiver-based OADM 200 according to a preferred embodiment of the present invention.

FIG. 2 depicts exemplary, coherent-receiver-based OADM 200 according to a preferred embodiment of the present invention.

As shown, OADM 200 includes drop side 202 and add side 204. The drop side includes splitter 206, wavelength blocker 208, and coherent receiver 210, which can either be implemented in a balanced configuration (illustrated) or in a single-ended configuration (not illustrated). The add side includes transmitter 212 and coupler 214.

At drop side 202 of the OADM, an input multiplex of data-encoded optical signals $S_d(\lambda_i)|_{i=1\ldots N}$ is split using power splitter 206 into a drop leg that feeds receiver 210 and a pass leg that feeds wavelength blocker 208.

At receiver 210, the drop-leg multiplex feeds input 234 of coupler 236. The other input (238) of coupler 236 is fed by one output of splitter 232 of transmitter 212 from the add side of the OADM. Note that splitter 232 is fed by laser 228, which has been tuned to emit an optical signal centered at wavelength $\lambda_d$. Thus, in coupler 236, the received signal $S_d(\lambda_i)|_{i=1\ldots N}$ and some of the power from the laser signal of wavelength $\lambda_d$ beat against each other upon photodetection at photodiodes 216 and 218, respectively, resulting in a heterodyning (if the beat frequency is not at baseband) or homodyning (if the beat frequency is at baseband) of the signal of interest $s_d(\lambda_d)$. Alternatively, a phase-diversity coherent receiver can be used to coherently detect the dropped signal. The electrical signal is then further processed (e.g., differenced (220) in the case of a balanced setup, squared and added in case of a phase-diversity setup, demodulated to baseband in a heterodyne setup, or simply low-pass filtered and amplified in case of a homodyne setup) by appropriate signal processing electronics 222. The processed signal is then fed to sampling/decision circuit 224 for detection and recovery of the data that was modulated onto $s_d(\lambda_d)$. The recovered data is then "dropped" to the local client.

Wavelength blocker 208, which receives a copy of the wavelength multiplex on the "pass leg" out of splitter 206, is configured to block the dropped wavelength $\lambda_d$ associated with the dropped signal element $s_d(\lambda_d)$ and pass the rest of the elements $S_d(\lambda_i)|_{i=\ldots N, i \neq d}$ in the multiplex to the add side of the OADM.

At add side 204 of the OADM, optical transmitter 212 is configured to modulate a locally supplied data stream onto an optical carrier of the same wavelength $\lambda_d$ that was dropped from the drop side of the OADM. This modulated optical carrier $s_a(\lambda_d)$ from the transmitter is then combined with the wavelengths of the multiplex that were passed from the drop side to the add side of the OADM to form a new multiplexed signal $S_a(\lambda_i)|_{i=1\ldots N}$ that is output from the OADM. The transmitter is also configured to supply light of wavelength $\lambda_d$ to the receiver of drop side 202.

More specifically, in the exemplary externally modulated transmitter configuration 212 depicted in FIG. 2, laser 228 is tuned to a wavelength $\lambda_d$, and its output is fed to splitter 232. One output of splitter 232 feeds input 238 of coupler 236 of receiver 210. The other output feeds external modulator (e.g., Mach-Zehnder modulator) 230 where the laser output at wavelength $\lambda_d$ is modulated with data from the local client that may have been pre-coded (e.g., return-to-zero (RZ) coded) by coder 226. This modulated add-side component signal $s_a(\lambda_d)$ is then fed to coupler 214 where it is combined with the elements $S_d(\lambda_i)|_{i=1\ldots N, i \neq d}$ of the input multiplex that were passed to the coupler by drop side 202, and the resulting combined multiplex is then output from the OADM.

Figure 3:
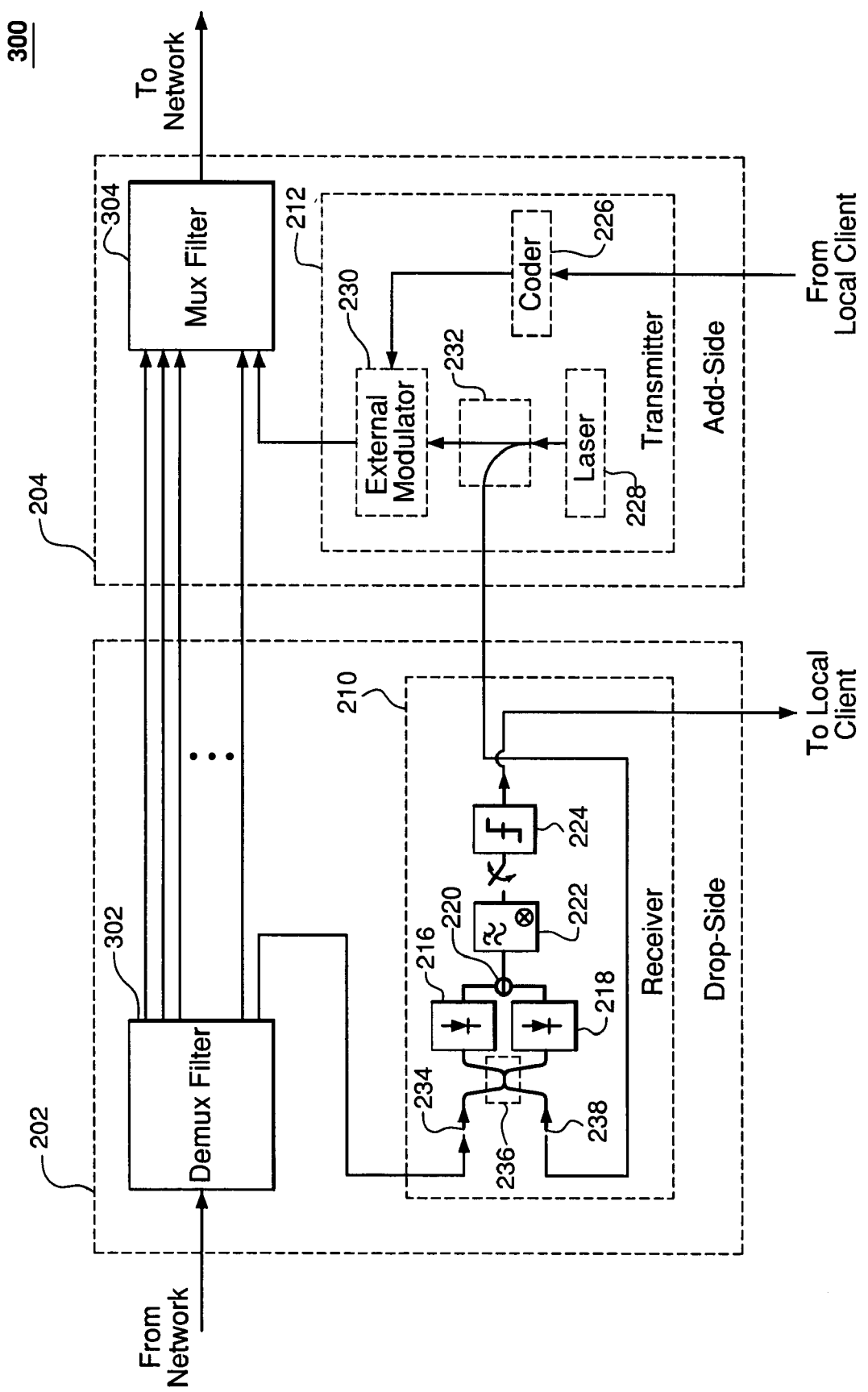
FIG. 3 depicts another exemplary coherent-receiver-based optical device 300 according to the present invention.

FIG. 3 illustrates an alternative embodiment 300 of the optical device of the present invention. Components of this embodiment operate similarly to corresponding components of the embodiment of FIG. 2. However, in the embodiment of FIG. 3, the splitter and wavelength blocker of FIG. 2 have been replaced with demultiplexing filter 302, and coupler 214 of FIG. 2 has been replaced with a multiplexing filter 304. The demux filter produces N output channels, each of a single wavelength. One of these wavelengths feeds receiver 210 where it is processed as described before with respect to the embodiment of FIG. 2. The remaining outputs, as well as the optical signal output from transmitter 212, feed mux filter 304, which combines the signals to form the overall output of the device.

Note that the receivers described in FIGS. 2 and 3 can be heterodyne, homodyne, or "phase-diversity coherent" homodyne receiver; in the latter, the local laser is not necessarily phase-aligned or phase-synchronized with the incoming signal, but the signal is essentially demodulated to baseband by the optical beating process. In a strictly homodyne receiver, special circuitry is added to a receiver to align the LO to the phase of the received carrier. This alignment is useful in systems that employ certain modulation schemes (e.g., phase-shift-keyed modulation) since the local oscillator may be used as a reference against which changes in the phase of the received signal (e.g., due to phase modulation) can be measured. In an alternative embodiment of the present invention, the output of splitter 232 may be passed through a phase adjuster before being fed to coupler 236. In the phase adjuster, the phase of the laser may be adjusted so that it is aligned with the phase of the incoming signal $s_d(\lambda_d)$ to support true homodyne reception. Alternatively, the phase of laser 228 may be adjusted directly, as would be understood to one skilled in the art.

Note that, although not explicitly shown in FIG. 2, in one or more implementations of the present invention, the wavelength blocked by wavelength blocker 208 and the fundamental wavelength emitted by laser 228 are configurable and may be configured dynamically (e.g., via a controller with simple network management protocol support).

Note that, the invention as described with respect to exemplary OADM embodiment 200 of FIG. 2 may be used to demodulate an amplitude-modulated (e.g., on-off keyed (OOK)) optical signal, as well as other modulation formats (e.g., carrier-suppressed OOK, duobinary, alternate mark inversion, chirped return-to-zero, differential phase-shift-keyed (DPSK), and differential quadrature-phase-shift-keying (DPQSK)) as would be understood by one skilled in the art.

Although the coherent receiver 210 as described in the exemplary embodiment of FIG. 2 includes circuitry for the conversion of the homodyned optical signal to an electrical format, a device that includes a mechanism that transmits the combined local oscillator signal and the received signal and drops the combined signal to the local client or a remote location without first converting it into the electrical domain and homodyning is within the spirit and scope of the present invention. Likewise, a device that includes a receiver that homodynes the received optical signal with a portion of the light that is used by the transmitter, and then performs O-E conversion as per the discussion corresponding to receiver 210 of FIG. 2, but then performs an E-O conversion prior to dropping the signal to the local client or prior to processing the signal further in the optical domain, is also within the spirit and scope of the present invention.

Although the present invention was illustrated with respect to a preferred embodiment that includes a balanced receiver, as discussed, single-ended, homodyne, heterodyne, or phase-diversity homodyne receiver configurations are within the scope of the present invention.

Although, the present invention was described with respect to a device known in the art as an OADM and with respect to a single drop and a single add wavelength, the concepts and advantages of the present invention also apply to a broad range of optical devices and subsystems where both a receiver and transmitter are present and one or more of the laser or laser sources in the device may be shared with the receiver electronics. It also applies to devices that receive, block, and/or transmit more than one concurrent wavelength, as would be understood to one skilled in the art. The present invention also applies to an end node of an optical communications system where more than one of the incoming data signals corresponding to wavelengths in the input WDM signal is dumped (i.e., not passed along together with the locally added light).

Note that elements of the present invention may be implemented by various techniques and in various technologies while remaining within the principle and scope of the present invention. These techniques and technologies include, but are not limited to: photonic integrated receiver technology, integrated optics (including silicon on silicon substrate or Si:SiO$_2$), fiber optics, free-space optics, thin film, InGaAs, micromirror micro-electro-mechanical arrays, and optical grating subsystems.

While this invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An optical device, comprising:
   an optical receiver adapted to process at least a portion of an incoming optical signal received by the optical device;
   an optical transmitter adapted to generate at least a portion of an outgoing optical signal transmitted by the optical device; and
   a demux filter adapted to wavelength split the incoming optical signal into N discrete single wavelength signals, wherein:
   the optical transmitter comprises a light generator adapted to generate light for the portion of the outgoing optical signal generated by the optical transmitter;
   the optical receiver is optically coupled to the light generator to receive and use part of the light generated by the light generator to process the portion of the incoming optical signal;
   the receiver receives one of the N single wavelength signals; and
   an output mux filter receives the rest of the N single wavelength signals and combines them with the portion of the outgoing optical signal generated by the transmitter.

2. The invention of claim 1, wherein the optical device is an optical add/drop multiplexer and the incoming and outgoing optical signals are WDM signals.

3. The invention of claim 1, wherein the optical device is an end node of an optical communications system and the incoming optical signal is a WDM signal.

4. The invention of claim 1, wherein the receiver is balanced.

5. The invention of claim 1, wherein the light generator is adapted to be dynamically tuned to one wavelength of a plurality of different wavelengths.

6. The invention of claim 1, wherein the light generator is a laser.

7. The invention of claim 1, wherein the receiver is a homodyne receiver.

8. The invention of claim 1, wherein the receiver is a heterodyne receiver.

9. The invention of claim 1, wherein the receiver is a phase-diversity homodyne receiver.

10. The invention of claim 1, wherein the receiver comprises an optical coupler having first and second input ports and a first output port, wherein:

the first input port is adapted to receive a first signal that includes the portion of the incoming optical signal received by the optical device; and the second port is adapted to receive a second signal that includes the part of the light generated by the light generator; wherein:

the coupler optically couples the first and second signals and outputs the result of the coupling on the first output port.

11. The invention of claim 10, wherein the receiver further comprises circuitry adapted to convert and process the result of the coupling that is output from the first output port of the coupler to and in the electrical domain.

12. A method for processing WDM optical signals in an optical device, comprising:

wavelength demultiplexing an incoming WDM optical signal received by the optical device into N signals, receiving one of the single wavelength signals of a first wavelength at a receiver;

sending the N−1 remaining single wavelength signals to an output multiplexer;

generating light of substantially the first wavelength;

feeding the light to a receiver, and to a transmitter that produces an added optical signal of substantially the first wavelength; and combining, at the multiplexor, the added optical signal and the N−1 remaining single wavelength signals to form a new N signal WDM optical output.

13. An optical device, comprising:

an optical receiver adapted to process at least a portion of an incoming optical signal received by the optical device; and an optical transmitter adapted to generate at least a portion of an outgoing optical signal transmitted by the optical device;

a splitter adapted to split the incoming optical signal, wherein the receiver receives part of the incoming optical signal from the splitter;

a wavelength blocker adapted to:

receive another part of the incoming optical signal from the splitter, block at least one wavelength of light from the part of the incoming optical signal that is received by the wavelength blocker wherein the wavelength is at least one of the wavelengths in the light generated by the transmitter, and pass the remainder of the incoming optical signal; and a coupler adapted to combine the remainder of the incoming optical signal from the wavelength blocker with the portion of the outgoing optical signal generated by the transmitter, wherein:

the optical transmitter comprises a light generator adapted to generate light for the portion of the outgoing optical signal generated by the optical transmitter; and the optical receiver is optically coupled to the light generator to receive and use part of the light generated by the light generator to process the portion of the incoming optical signal.

14. A method for processing WDM optical signals in an optical device, comprising:

splitting an incoming WDM optical signal received by the optical device into first and second parts;

dropping a first optical signal from the first part of the incoming WDM optical signal;

blocking the first optical signal from the second part of the incoming WDM optical signal, and adding a second optical signal to the remainder of the optical signals in the second part of the incoming WDM optical signal to generate an outgoing WDM optical signal transmitted by the optical device, wherein:

the first and second optical signals have substantially the same fundamental carrier wavelengths; and a portion of the light used to add the second optical signal is used to drop the first optical signal.

15. The invention of claim 14, wherein the optical device is an optical add/drop multiplexer.

16. The invention of claim 14, wherein the second optical signal is a modulated laser signal.

17. The invention of claim 14, wherein the dropping is performed by a receiver that is a homodyne, heterodyne, or phase-diversity homodyne receiver.

18. The invention of claim 17, wherein the receiver comprises an optical coupler adapted to:

couple (a) the second part of the incoming WDM optical signal and (b) the portion of the light; and generate an internal signal that includes a representation of data that was modulated onto a fundamental wavelength of the first optical signal in the incoming WDM optical signal.

19. The invention of claim 17, wherein the receiver further comprises circuitry adapted to convert and process the internal signal to and in the electrical domain.

20. The invention of claim 17, wherein the receiver is balanced.

21. The invention of claim 14, wherein the light generator is adapted to be dynamically tuned to one wavelength of a plurality of different wavelengths.

* * * * *